United States Patent
Lewis et al.

(10) Patent No.: US 9,876,798 B1
(45) Date of Patent: Jan. 23, 2018

(54) REPLACING UNAUTHORIZED MEDIA ITEMS WITH AUTHORIZED MEDIA ITEMS ACROSS PLATFORMS

(71) Applicant: Google Inc., Mountain View, CA (US)

(72) Inventors: Justin Lewis, Marina del Rey, CA (US); Ruxandra Georgiana Davies, Santa Monica, CA (US)

(73) Assignee: GOOGLE LLC, Mountain View, CA (US)

( * ) Notice: Subject to any disclaimer, the term of this patent is extended or adjusted under 35 U.S.C. 154(b) by 63 days.

(21) Appl. No.: 14/667,604

(22) Filed: Mar. 24, 2015

Related U.S. Application Data

(60) Provisional application No. 61/973,258, filed on Mar. 31, 2014.

(51) Int. Cl.
*H04L 29/06* (2006.01)
*H04L 29/08* (2006.01)

(52) U.S. Cl.
CPC ............ *H04L 63/10* (2013.01); *H04L 67/104* (2013.01)

(58) Field of Classification Search
CPC ....... H04L 63/10; H04L 67/104; H04L 51/32; H04L 2463/101; G06Q 50/01; G06Q 50/184; G06F 21/62; G06F 2221/2115
See application file for complete search history.

(56) References Cited

U.S. PATENT DOCUMENTS

| | | | | |
|---|---|---|---|---|
| 7,707,224 | B2* | 4/2010 | Chastagnol | G06Q 30/06 707/705 |
| 7,937,582 | B1* | 5/2011 | Lee | G06F 21/6218 709/218 |
| 8,655,826 | B1* | 2/2014 | Drewry | G06F 21/10 706/48 |
| 2005/0114709 | A1* | 5/2005 | Moore | H04L 63/10 726/4 |
| 2008/0155701 | A1* | 6/2008 | Martinez | G06F 21/10 726/27 |
| 2008/0178302 | A1* | 7/2008 | Brock | G06F 17/30864 726/32 |
| 2008/0228733 | A1* | 9/2008 | Davis | G06Q 10/06 |
| 2010/0058478 | A1* | 3/2010 | Shetty | G06F 21/10 726/26 |
| 2010/0169655 | A1* | 7/2010 | Chastagnol | G06Q 30/06 713/176 |

(Continued)

OTHER PUBLICATIONS

Seomoz: DMCA takedown notice, Jan. 2008, Seomoz.org, 1 page.*
Gene Quinn "Sample DMCA take down letter", IPWatchdog.com, Jul. 6, 2009, 11 pages.*

*Primary Examiner* — Catherine Thiaw
(74) *Attorney, Agent, or Firm* — Lowenstein Sandler LLP

(57) ABSTRACT

A method of replacing an unauthorized media item on one platform with an authorized media item on another platform is provided herein. The method includes receiving a user request to send a notice pertaining to unauthorized content corresponding to an authorized media item of the user. The user is a rights holder of the authorized media item. The method further includes generating a notice identifying the unauthorized content to a third-party platform as being unauthorized. The unauthorized content is identified in a media item presented by the third-party platform and the notice includes a link to the authorized media item.

27 Claims, 7 Drawing Sheets

(56) References Cited

U.S. PATENT DOCUMENTS

| | | | |
|---|---|---|---|
| 2012/0209963 A1* | 8/2012 | Patel | G06F 17/3089 709/219 |
| 2013/0013583 A1* | 1/2013 | Yu | G06F 17/3084 707/709 |
| 2013/0166904 A1* | 6/2013 | Amaya Calvo | G06F 17/30056 713/151 |
| 2013/0312112 A1* | 11/2013 | Troiano | G06F 21/60 726/27 |
| 2013/0329968 A1* | 12/2013 | Ranjan | G06F 21/6245 382/118 |
| 2014/0040374 A1* | 2/2014 | Olsen | H04L 67/306 709/204 |

* cited by examiner

Notice 300

TO: Operator of Third-Party Platform 222A
FROM: Operator of Content-Sharing Platform 140
DATE: January 1, 2015
SUBJECT: Information about a media item embedded on Third-Party Platform 222A Dear Operators of Third-Party Platform 222A, Explanatory Text 302

The video "Video Title" which is presented on Third-Party Platform 222A at this address: http://thirdpartyplatform.com/123567 may have content that is owned or license by User 148A. User 148A has not authorized the presentation of the content and requests its removal from Third-Party Platform 222A.

This video may be replaced with the authorized version on Content-Sharing Platform 140:
Video Link: https://www.contentsharingplatform.com/345890
Embed Link: https://www.contentsharingplatform.com/345890embed Links 304

Sincerely,
The Operators of Content-Sharing Platform 140

FIG. 3

REPLACING UNAUTHORIZED MEDIA ITEMS WITH AUTHORIZED MEDIA ITEMS ACROSS PLATFORMS

CROSS-REFERENCE TO RELATED APPLICATIONS

This application claims the benefit of U.S. Provisional Application No. 61/973,258, entitled, "REPLACING UNAUTHORIZED MEDIA ITEMS WITH AUTHORIZED MEDIA ITEMS ACROSS PLATFORMS," filed Mar. 31, 2014, the entire content of which are incorporated herein by reference.

TECHNICAL FIELD

This disclosure relates to the field of content-sharing platforms and, in particular, to replacing unauthorized media items with authorized media items.

BACKGROUND

On the Internet, content-sharing platforms, like social networks and others, allow users to connect to and share information with each other. Many social networks include a content-sharing aspect that allows users to upload, view, and share content, such as video content, image content, audio content, and so on (which may be collectively referred to as "media items" or "content items"). Such media items may include professionally produced audio clips, movie clips, TV clips, and music videos, as well as amateur content such as video blogging, short original videos, pictures, photos, audio recordings, other multimedia content, etc. Users may use computing devices (such as smart phones, cellular phones, laptop computers, desktop computers, netbooks, and tablet computers) to access the content-sharing platforms to use, play, and/or consume media items (e.g., watch digital videos, and/or listen to digital music).

In some instances, a user may upload or otherwise share a media item that the user may not be authorized to distribute. For example, a user may upload a copyrighted video or a copyrighted song without being authorized by the copyright holder of the video or song. In such an example, the rights holder may request that the content-sharing platform, and/or the user who uploaded the media item, be removed from the content-sharing platform by sending a "takedown" notice. The rights holder may request that the unauthorized media content be taken down for many reasons: the unauthorized media item may not generate compensation for its rightful owner on the particular content-sharing platform, the unauthorized media item may be of a lower quality than is acceptable to the rights holder, the unauthorized media item may not properly attribute the underlying work or works, etc. While the removal of unauthorized material from the content-sharing platform may be required by law after a compliant notice, it can upset the user who posted the unauthorized media item and leave dead links and/or unsightly notices that the content was removed in response to a takedown notice.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

In some embodiments, a method of replacing an unauthorized media item on a third-party platform with an authorized media item on a content-sharing platform is provided herein. The method includes receiving a user request to send a notice pertaining to unauthorized content corresponding to an authorized media item of the user. The user is a rights holder of the authorized media item. The method further includes generating a notice identifying the unauthorized content to a third-party platform as being unauthorized. The unauthorized content is identified in a media item presented by the third-party platform and the notice includes a link to the authorized media item.

In some embodiments, the link permits the authorized media item to be presented by the third-party platform in place of the unauthorized content. The link may replace a reference in social shares on the third-party platform, with the reference linking the social shares to the unauthorized content in one or more media items. In addition, the method may further include identifying the unauthorized content in one or more media items corresponding to the authorized media item by crawling the third-party platform.

In yet more embodiments, the method further includes receiving user input indicating that one of the identified one or more media items includes the unauthorized content. The method may also include providing information identifying the unauthorized content in one or more media items presented by the third-party platform and sending the notice to the third-party platform. In addition, the method may include receiving a request for the authorized media item from a third-party platform user and causing the rights holder to be remunerated for a presentation of the authorized media item on the third-party platform to the third-party platform user.

In additional embodiments, receiving the user request to send the notice further includes determining a notice policy of the user, the notice policy directing a predetermined response to information identifying the unauthorized content in one or more media items corresponding to the media item of a user. Generating the notice may be performed according to the notice policy of the user. The method may include determining one or more media requirements of the third-party platform and determining an appropriate version of the authorized media item based on the one or more media requirements, wherein the link is a link to the appropriate version of the authorized media item. Also, the method may include sending the notice to the third-party platform and another third-party platform. The third-party platform may present the unauthorized content and the other third-party platform may host the unauthorized content.

In additional embodiments, computing devices for performing the operations of the above described embodiments are also disclosed. Additionally, in embodiments of the disclosure, a computer-readable storage media stores methods for performing the operations of the above described embodiments.

BRIEF DESCRIPTION OF THE DRAWINGS

The present disclosure is illustrated by way of example, and not by way of limitation, in the figures of the accompanying drawings.

FIG. 3 illustrates an exemplary notice, in accordance with some embodiments of the disclosure.

DETAILED DESCRIPTION

Figure 1:
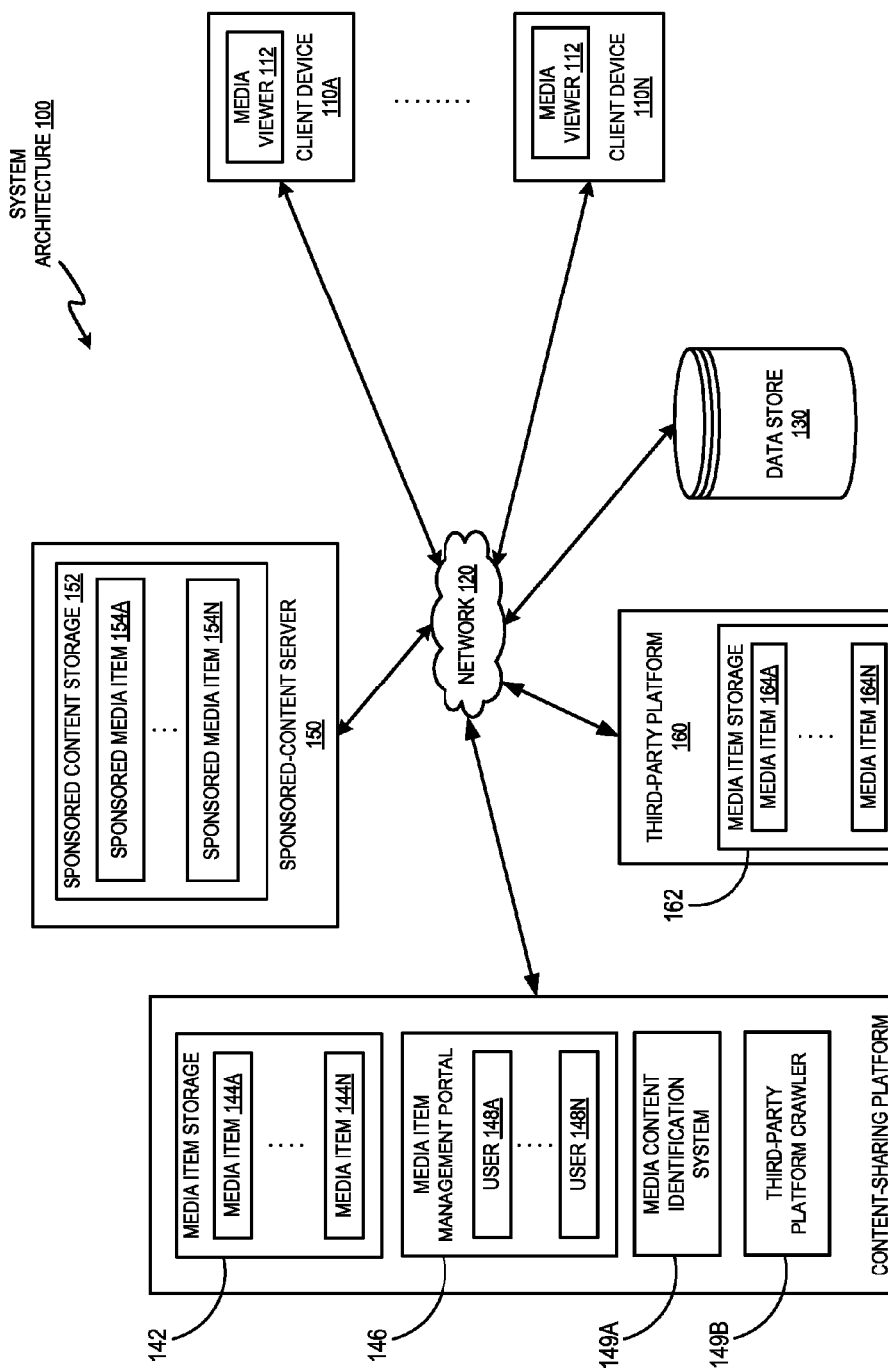
FIG. 1 illustrates an exemplary system architecture, in accordance with one embodiment of the disclosure.

Implementations are described for replacing an unauthorized media item on a third-party platform with a corresponding authorized media item hosted by a content-sharing platform. Content owners or agents responsible to those content owners may publish many different kinds of content to one or more content-sharing platforms. Some content-sharing platforms may provide for more robust tracking, identification, and monetization mechanisms, while others may not or may provide limited tracking, identification, and/or monetization mechanisms. The differences in content-sharing platform features may be of such significance as to deter some content creators from publishing content on some platforms. Additionally, while a content creator may publish some content on a particular platform, some content on that platform may be unauthorized. When a creator's content is published without authorization, that creator may receive no financial benefit, no reputational benefits where the work is unattributed or incorrectly attributed, and may be able to exercise limited quality control over the content.

Implementations of the disclosure enable a content creator or another rights holder to extend the benefits of a preferred content-sharing platform into a third-party content-sharing platform. Information identifying unauthorized media items being presented on the third-party platform may be provided to the rights holder in a user interface provided by the preferred content-sharing platform. The rights holder can then request that the preferred content-sharing platform send takedown notices under the copyright laws of the relevant jurisdiction, such as the Digital Millennium Copyright Act (DMCA) in the United States of America. In addition, the rights holder can request to include a link to a corresponding, but authorized, media item published by the rights holder on the content-sharing platform.

Alternatively, the preferred-content sharing platform can generate such notices automatically. For example, a content creator may request that when the preferred content-sharing platform detects or identifies unauthorized content on a specific third-party content-sharing platform, the preferred platform automatically sends a notice, including a link to a corresponding, authorized media item. Thereafter, when the preferred content-sharing platform identifies such content, it will send the notice as requested in advance. This notice policy and other notice policies may be created by the content creator to direct certain actions depending on the type of unauthorized content identified, the specific platform hosting or presenting the unauthorized content, the user of the third-party platform that posted the unauthorized content, etc.

In general, when a third-party content-sharing platform or site receives a notice that a media item presented on the site is unauthorized, the site may review the notice and decide to stop the presentation of the media item. The removal of the media item is often accompanied by a notice to any users of the site that the media item is removed as allegedly violating existing copyright law. This notice to the users or a blank frame may be displayed in place of the removed media item, creating an unsightly feature on an otherwise carefully designed platform. Additionally, the user responsible for the uploading or sharing of the unauthorized media item is then unable to share the media item with others and may suffer a reputational harm as an alleged copyright infringer. Thus, the user may be discouraged from further uploading or sharing media items on the site, decreasing traffic and vitality to the third-party platform.

The inclusion of the link to the unauthorized content in the notice sent to the third-party platform provides the third-party site with another option. The third-party site may opt to embed or link the authorized media item as presented by the content-sharing platform, instead of merely taking down the unauthorized media item and/or references thereto. This replacement may allow for improved appearance and operation of the third-party platform, and it may allow the rights holder and the content-sharing platform to benefit from revenue derived from the authorized media item. The rights holder may also regain control over the media item, potentially replacing a lower quality version of the item with a higher quality version. Thus, embodiments of the invention may provide pecuniary and non-pecuniary benefits for those that are authorized to publish content and for those that are not.

FIG. 1 illustrates an exemplary system architecture 100, in accordance with an embodiment of the disclosure, for replacing unauthorized media items presented on a third-party platform with authorized media items presented on another content-sharing platform. The system architecture 100 includes a plurality of client devices 110A through 110N, a network 120, a data store 130, and a content-sharing platform 140. In one embodiment, network 120 may include a public network (e.g., the Internet), a private network (e.g., a local area network (LAN) or wide area network (WAN)), a wired network (e.g., Ethernet network), a wireless network (e.g., an 802.11 network or a Wi-Fi network), or a cellular network (e.g., a Long Term Evolution (LTE) network), having routers, hubs, switches, servers, and/or a combination thereof. In one embodiment, the data store 120 may include a memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers).

The client devices 110A-N may each include computing devices such as personal computers (PCs), laptops, mobile phones, smart phones, tablet computers, wearable computing devices etc. In some embodiments, client device 110A-N may also be referred to as "user devices." Each client device includes a media viewer 112. In one embodiment, the media viewers 112 may be applications that allow users to receive visible content, such as images, videos, web pages, documents, etc., and audio content such as live audio and sound recordings. For example, the media viewer 112 may be a web browser that can access, retrieve, present, and/or navigate content (e.g., web pages such as Hyper Text Markup Language (HTML) pages, digital media items, etc.) served by a web server. The media viewer 112 may render, display, and/or present the content (e.g., a web page, a media viewer) to a user. The media viewer 112 may also display an embedded media player (e.g., a Flash® player or an HTML5 player) that is embedded in a web page (e.g., a web page that may provide information about a product sold by an online merchant, a content-sharing platform such as a social network). In another example, the media viewer 112 may be a standalone application that allows users to view digital media items (e.g., digital videos, digital images, electronic books, etc.).

The media viewers 112 may be provided to the client devices 110A-N by the content-sharing platform 140, a sponsored-content server 150, and/or a third-party platform 160. For example, the media viewers 112 may be embedded media players that are embedded in web pages provided by the content-sharing platform 140 or the third-party platform 160. In another example, the media viewers 112 may be applications that are downloaded from a server accessible to the client devices 110A-N through the network 120.

In general, functions described in one embodiment as being performed by the content-sharing platform 140 can also be performed on the client devices 110A-N in other embodiments if appropriate. In addition, the functionality attributed to a particular component can be performed by different or multiple components operating together. The content-sharing platform 140 can also be accessed as a service provided to other systems or devices through appropriate application programming interfaces, and thus is not limited to use in websites.

In one embodiment, the content-sharing platform 140 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content-sharing platform 140 may allow a user to consume, upload, search for, approve of ("like"), dislike, share, and/or comment on media items. The content-sharing platform 140 may also include a website (e.g., a webpage) that may be used to provide a user with access to the media items.

In embodiments of the disclosure, a "user" may be represented as a single individual. However, other embodiments of the disclosure encompass a "user" being an entity or agent controlled by a rights holder of content. For example, a user may by an agent of a company, such as a media company, that distributes some or all of its content online. In such instances, the user may be a representative of the company that is acting in the content-sharing platform 140 with the company's or community's authorization.

The content-sharing platform 140 includes a media item storage 142 that includes a plurality of media items 144A through N. Examples of media items 144A-Z can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc.

A media item may be consumed (e.g., viewed, heard) via the Internet and/or via a mobile device application. As used herein, "media," media item," "online media item," "digital media," "digital media item," "content," and "content item" can include an electronic file that can be executed or loaded using software, firmware or hardware configured to present the digital media item to an entity.

In some embodiments, the content-sharing platform 140 may store the media items 144A-Z using the data store 130. The media items 144A-N may be retrieved from data store 130 prior to delivery to one or more of clients 110A-N over network 120. Thereafter, one or more of the media items 144A-N may be presented to a user of the client 110A through the viewer 112 operating thereon. A media item management portal 146 may also operate as part of the content-sharing platform 140. The media item management portal 146 may maintain information regarding a plurality of users 148A-N of the content-sharing platform 140. Such information may include a media item history of the user that includes items the user has consumed and may also include information regarding media items shared or uploaded to the content-sharing platform 140. The media item management portal 146 may present users of the content-sharing platform with a user interface to view information regarding previously uploaded media items, to upload new media items, and to claim media items presented on the content-sharing platform 140 but uploaded by other users.

By way of example, a user that holds the rights to the copyrighted works of a music group may upload music videos by the music group. Thus, the uploaded media items (i.e., the music videos, which contain visual and audio content) are authorized media items. A fan of the music group may rip the audio for a song by the music group from a compact disc, add the fan's own visual content, and then upload the media item. While the media item was not uploaded by the user that holds the rights of the music group, a media content identification system 149A may provide an indication to the user through the media item management portal 146 that the fan's uploaded media item may include unauthorized content belonging to the music group. The media item management portal 146 may provide options to the user to send a takedown notice to the fan and/or to have the unauthorized media item taken down by the content-sharing platform 140.

In order to generate revenue from the user's uploaded media items, the insertion of sponsored content (e.g., advertisement) may be provided by a sponsored-content server 150. The sponsored-content server 150 may be operated by an operator of the content-sharing platform 140 or by another operator. The user may select, through the media item management portal 146 to have a media item displayed with advertising before, after, or during the display of the media item to users through clients 110A-N. The sponsored-content server 150 includes a sponsored content storage 152 having a plurality of sponsored media items 154A-N stored thereon. The sponsored media items 154A-N may include text, audio, and/or visual content.

As an example, the first user may hold the rights to media item 144A. Through the media item management portal 146, the first user may select to have one or more sponsored media items 154A-N displayed to the second user when the second user requests the media item 144A. The owner of the sponsored media item 154A may then pay the first user an amount of money. In this way, the first user may use the rights to media item 144A to generate revenue, and the owner of the sponsored media item 154A may be able to communicate its message (e.g., an advertisement) to the user of the client device 110A.

The system architecture 100 illustrated in FIG. 1 also includes the third-party platform 160. Other embodiments of the system architecture 100 may include many more such third-party platforms. As illustrated, the third-party platform 160 includes a media item storage 162 having a plurality of media items 164A-N stored thereon. The third-party platform 160 may share many of the features described herein with respect to the content-sharing platform 140. In some embodiments, the third-party platform 160 may not have a relationship to a sponsored-content server 150 to provide rights holder of media items 164A-N with an opportunity to generate revenue by including one or more of sponsored media items 154A-N in the display of media items 164A-N to users of client devices 110A-N.

In some instances, one or more of media items 164A-N may include authorized media content, the rights to which are held by the first user of the content-sharing platform 140. The content-sharing platform 140 may provide the first user with options that facilitate gaining control over unauthorized media items presented by the third-party platform 160 and facilitate the financial rewarding of content displayed in media items on the third-party platform 160.

For example, the first user may upload a short film with visual and audio content as the media item 144A. The content-sharing platform 140 may recognize the first user as holding the rights to the media item 144A and may provide remuneration to the first user when the media item 144A is displayed to a user of the client device 110A with the sponsored media item 154A. In this example, the sponsored media item 154A may be a text-based advertisement displayed by the media viewer 112 during the display of the media item 144A. The user of the client 110A may want to share the media item 144A with friends, followers, or other users on the third-party platform 160. The user may make an unauthorized copy and upload the unauthorized copy as the media item 164A in the media item storage 162. The unauthorized media item 164A may then be presented to other users of the third-party platform 160. The first user may not have authorized any presentation or publication of the media item 144A on the third-party platform 160 and may not be deriving any revenue from its display thereon.

The content-sharing platform 140 includes a third-party platform crawler 149B that navigates through the network 120 to identify and crawl third-party platforms accessible by way of the network 120. As illustrated in FIG. 1, the crawler 149B may crawl the third-party platform 160. The crawler may identify the media items 164A-N being presented by the third-party platform 160. After these media items 164A-N are identified, they may be "fingerprinted" or otherwise processed by the media content identification system 149A to identify the media content included therein. For example, this may be done to identify potentially unauthorized media items (media items that match or are similar to authorized content hosted by the content-sharing platform 140). For example, the media content identification system 149A may identify the media item 164A as being or containing a copy of the media item 144A.

The media item management portal 146 may provide a user interface to the first user that identifies media items uploaded and/or claimed by the first user and policies associated with those media items. Additionally, the content-sharing platform 140 may provide information to the first user identifying content found on other platforms that matched (or was similar to) media items in the media item storage 142 associated with the first user. The management portal 146 may generate notifications to warn the first user about potentially wrongful use of the authorized media items of the user. Thus, the media item management portal 146 may display to the first user that the media item 164A was indicated by the media content identification system 149A as containing content related to the media item 144A. The media item management portal 146 may include information obtained from the media content identification system 149A that indicates whether the media item 164A appears to be a direct copy or an indirect copy of the media item 144A or if one component of the media item is identified, such as the audio component only.

In the ongoing example, the management portal 149A may indicate that the media item 164A is a direct copy of the media item 144A (e.g. a scraping tool was used to copy the media item 144A from the content-sharing platform 140). The management portal 146 may also indicate to the first user an identifier of the third-party platform 160. In this way, the first user is presented with notification and information regarding the potentially unauthorized media item 164A through the management portal 146.

The management portal 146 may, through a user interface, receive a confirmation from the first user that at least some of the content of the media item 164A is unauthorized, and thus that the media item 164A is an unauthorized media item. For example, the management portal 146 may query the first user to determine whether the first user is a legal rights holder to at least some of the content in the media item 164A. As described above, the content-sharing platform 140 may provide revenues received from the operator of the sponsored-content server 150 to the first user, thereby encouraging the first user to make content, the rights to which are held by the first user, available on the content-sharing platform 140. Thus, the unauthorized presentation of the media item 164A may harm both the first user and the content-sharing platform 140.

In effort to limit the unauthorized presentation on the third-party platform 160 of the authorized media items available on the content-sharing platform 140, the management portal 146 may provide an interface to the first user to facilitate the sending of notices to services that host and/or embed unauthorized media items. Thus, after or as part of the identification of the media item 164A as potentially unauthorized, the management portal 146 may present the first user with an option to send a takedown notice to the operator of the third-party platform 160. The notice may provide an identifier of the media item 164A, an identifier of a rights holder to at least some of the content therein (e.g., the first user), and a request to remove the content from further presentation on the third-party platform. In embodiments in which the third-party platform 160 presents the media item 164A as an embedded media item, while the media item 164A is actually hosted on another third-party platform (not depicted), the notice may further include a statement that the host of the media item 164A has been or will be notified of the unauthorized presentation of content belonging to the rights holding first user. Upon receipt of the notice, the operator of the third-party platform 160 may review the notice to see whether taking down the content is the appropriate course of action under the applicable laws and device to remove the content.

The management portal 146 may further present the first user, in a user interface, with an option to include one or more links to the media item 144A. The first user may interact with the management portal 146 to request the inclusion of one or more links to the authorized media item 144A (as presented on the content-sharing platform 140) in the notice sent to the operator of the third-party platform 160. This notice may be sent as an email and may be sent by the content-sharing platform 140 (e.g., on behalf of the first user).

In some embodiments, the first user may select or enter a policy that directs an automated response when content is subsequently identified by the operation of the crawler 149B and the identification system 149A as being potentially unauthorized. For example, the user may be able to set a policy that is specific to a certain media item or to a certain third-party platform. The user may set up an automatic notice whenever content of media item 144A is identified on a specific third-party platform, such as the third-party platform 160. The first user may be aware that no remunerative relationship exists between the first user and the third-party platform 160 and so elect to send the notice in all cases identifying media items, the rights to which are held by the first user, that are presented on the third-party platform 160. As another example, the first user may direct a notice to be sent in all cases in which the audio of a media item on presented on any third-party platform matches the audio of the media item 144A but visual content does not. The first user may also direct that these notices include one or more links to the authorized media item 144A to encourage the presenting platform to include the authorized media item 144A in place of the unauthorized media item. Thus, the notices may be sent or not sent, with or without links to authorized media items, on a case by case basis at the direction of the first user or based on predetermined, preselected policies of the first user that are saved in a database containing information for the first user.

In situations in which the systems discussed here collect personal information about users, or may make use of personal information, the users may be provided with an opportunity to control whether the content sharing platform 140 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content-sharing platform 140.

Figure 2:
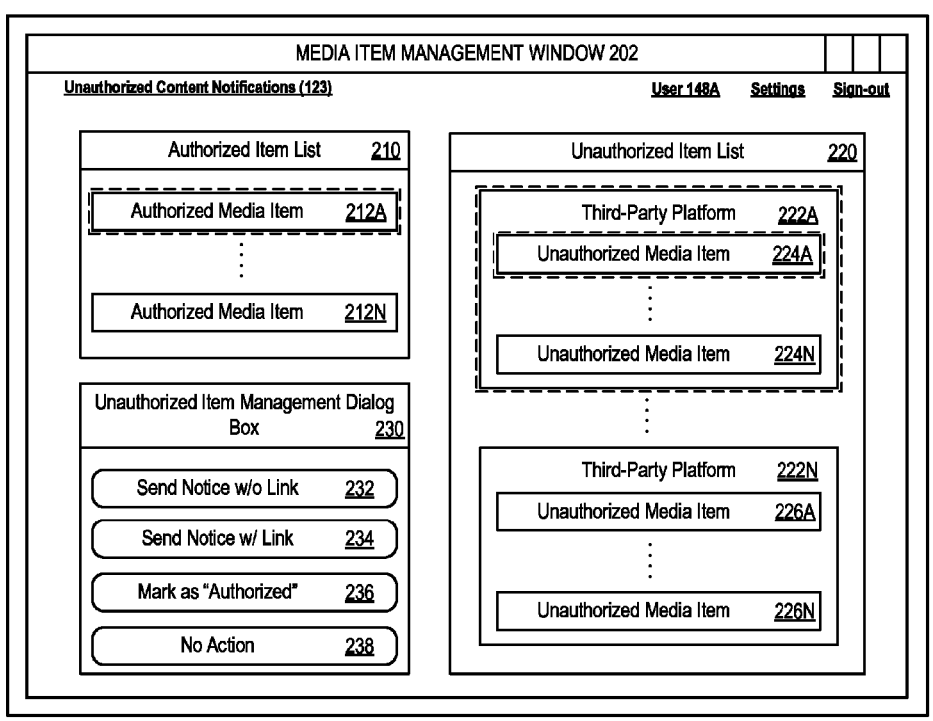
FIG. 2 illustrates a user interface presented to a user of a content-sharing platform to facilitate the replacement of an unauthorized media item with an authorized media item, according to an embodiment of the disclosure.

An example of a user interface provided by the media item management portal 146 is shown in FIG. 2. Referring to FIG. 2, a user interface 200 with a media item management window 202 is illustrated therein. The management window 202 may be provided to the first user through a display of a client system used by the first user to interact with the content-sharing platform 140. The management window 202 includes an authorized item list 210 that lists the media items that the first user has authorized either by uploading to the content-sharing platform 160 or by claiming content presented on the content-sharing platform 160 as including content over which the first user holds at least some rights. Thus, as illustrated, the authorized item list 210 includes authorized media items 212A-N.

The management window 202 further includes an unauthorized item list 220 that lists items identified by the crawler 149B and the identification system 149A as corresponding to one of authorized media items 212A-N. The unauthorized item list 220 may include a listing of unauthorized media items by the third-party platform on which they are presented, whether embedded and/or hosted. As illustrated, the unauthorized item list 220 includes items from a third-party platform 222A and a third-party platform 222N. A notification may be generated for and provided to communicate the matches identified by the identification system 149A. A plurality of unauthorized media items 224A-N are illustrated as being presented on the third-party platform 222A, while unauthorized media items 226A-N are illustrated as being presented on the third-party platform 222N. The unauthorized media items 224A-N and 226A-N may be flagged as potentially unauthorized, such that confirmation from the first user, having knowledge of the authorized exercise of rights to media content held by the first user, may confirm that they are legally unauthorized when that is the case.

When the first user selects the authorized media item 212A from the authorized item list 210, the user interface 200 may highlight, or otherwise identify, any media items in the unauthorized item list 220 that were marked by the identification system 149A as corresponding to the authorized media item 212A. The user interface 200 identifies the corresponding media items, in this example the unauthorized media item 224A presented on the third-party platform 222A, as being potentially unauthorized.

When the user selects the unauthorized media item 224A, an unauthorized content management dialog box 230 may be displayed to the first user or otherwise become active in the management window 202. The unauthorized content management dialog box 230 may present the first user with options regarding the unauthorized media item 224A. The dialog box 230 may be presented to the first user to prompt the first user to decide whether the notice should include the link. As illustrated, the dialog box presents a button 232 to send a notice regarding the unauthorized media item 224A without a link. An email requesting the removal of the unauthorized media item 224A may be generated upon selection of the button 232 and sent to the third-party platform 222A. The dialog box 230 also presents a button 234, the selection of which may send a notice to the third-party platform 222A. This notice includes at least one link to the authorized media item 212A as presented on the content-sharing platform 140.

In some embodiments, the dialog box 234 may also present a button 236 by which the first user may indicate that the presentation of a media item listed on the unauthorized item list 220 is actually an authorized presentation. A "no action" button 238 may be selected by the first user to indicate that no action should be taken. For example, if a home video is identified as including a song, the user may decide not to send a takedown notice to avoid bad publicity. This information may be used to update the information presented to the first user in the media item management window 202 and to avoid clutter in the unauthorized item list 220. Other user interface features may be employed in other embodiments of the user interface 200 to present potentially unauthorized media items to a first user to facilitate the user in encouraging third-party platforms to embedded authorized media items in place of the unauthorized media items.

Alternatively or additionally, another user interface (not shown) may be provided by the media item management portal 146 to permit the user to establish one or more notice policies whereby the first user may request the sending of a notice in advance of any identification of unauthorized content. This user interface may be similar to that presented in the exemplary user interface 200 of FIG. 2. For example this other user interface may include an authorized item list that presents the user with the media items the user has authorized on the content-sharing platform 140. In the user interface, the user may additionally be presented with a listing of content types (e.g., video, audio, images, etc., and combinations thereof) and a listing of third-party platforms that the content-sharing platform 140 crawls or may crawl in search of unauthorized content. The user may select a particular third-party platform and, knowing that the user does not authorize content on that platform, request that a notice be sent automatically whenever unauthorized content corresponding to one of the user's authorized media items is identified. In this way, the user may provide an indication that such content is unauthorized by the user and also request the sending of the notice. The user may select the inclusion of the links in the notice.

Many variations of notice policies may be entered by the user. For example, the user may request that a particular authorized media item have notice policies specific to it, but not applied to another authorized media item. The user may request that only certain types of unauthorized content are responded to by the content-sharing platform 140 with a notice and links to the corresponding authorized content. For example, the user may request that "lyric videos" posted by fans (i.e. media items that include the user's music with a fan's videos depicting the lyrics of the user's music) not automatically trigger the generation and sending of a notice with links to the authorized media item. At the same time, the user may request that unauthorized uploads or social shares of the user's music together with the user's corresponding video trigger the sending of the notice. Thus, user interface or interfaces provided by the media item management portal 146 may provide a user with many ways to request that a notice be sent to a third-party platform presenting unauthorized content of the user.

Referring now to FIG. 3, an exemplary notice 300 is illustrated therein. The notice 300 may be an email sent from the content-sharing platform 140 to the third-party platform 222A. The notice 300 may include explanatory text 302 that identifies the unauthorized media item or items, in this case the unauthorized media item 224A, to operators of the third-party platform 222A. If the media item 224A is hosted by another third-party platform and embedded on the third-party platform 222A, the explanatory text 302 may provide such information. When the first user selects the button 234, the notice 300 is sent to the third-party platform 222A with at least one link to the authorized media item 212A. As illustrated, the notice 300 includes links 304, a video link that presents the authorized media item 212A on the content-sharing platform 140 and an embed link to embed the authorized media item 212A in the third-party platform 222A. When the embed link is used, the content-sharing platform 140 may host the authorized media item 212A for the third-party platform 222A.

In some embodiments, the content-sharing platform 140 may determine one or more media requirements of the third-party platform 222A. For example, the third-party platform 222A may present or host media items in some media file formats but not in others. Additionally, the third-party platform 222A may present a certain resolution or bit-rate media file. The link or links present in embodiments of the notice 300 may be links to authorized media items that are compatible with the media requirements of the third-party platform 222A. Where one or more media requirements are identified, the content-sharing platform 140 may automatically include a link or links 304 that is appropriate to those third-party platform requirements.

The notice 300 may make it easier for the operator of the third-party platform 222A to comply with laws that prohibit the unauthorized presentation of media content while still presenting the content to its users. The content is presented by the content-sharing platform 140, which is authorized by the rights holder (first user), through the third-party platform 222A. The notice 300 may be an email or other computer-readable communication.

Rather than simply take the unauthorized media item 224A down, decreasing the aesthetic appearance of the third-party platform 222A or upsetting its users, the third-party platform 222A may opt to replace the unauthorized media 224A. This may be done by identifying references on the third-party platform 222A to the item identified in the notice 300 and replace those references with one of the links 304. This may be done by changing web links or by changing pointers to media files. For example, where the unauthorized media item 224A was shared by users of the third-party platform 222A as a link in a social share, the reference to the unauthorized media item 224A may be replaced with a link to the authorized media item 212A. As used herein, a social share refers to content (e.g., post, feed item) resulting from a user sharing a media item (e.g., via a share request) via a social network or a content-sharing platform. In some embodiments, a social share may not indicate approval of the user, but may still serve to introduce the media item into the feed of other users having a relationship with the user defined by the content-sharing platform. The third-party platform 222A may propagate this change to all users of the third-party platform 222A that received the social share in their feeds. Additionally, any future social shares may automatically include the link to the authorized media item 212A.

Figure 4A:
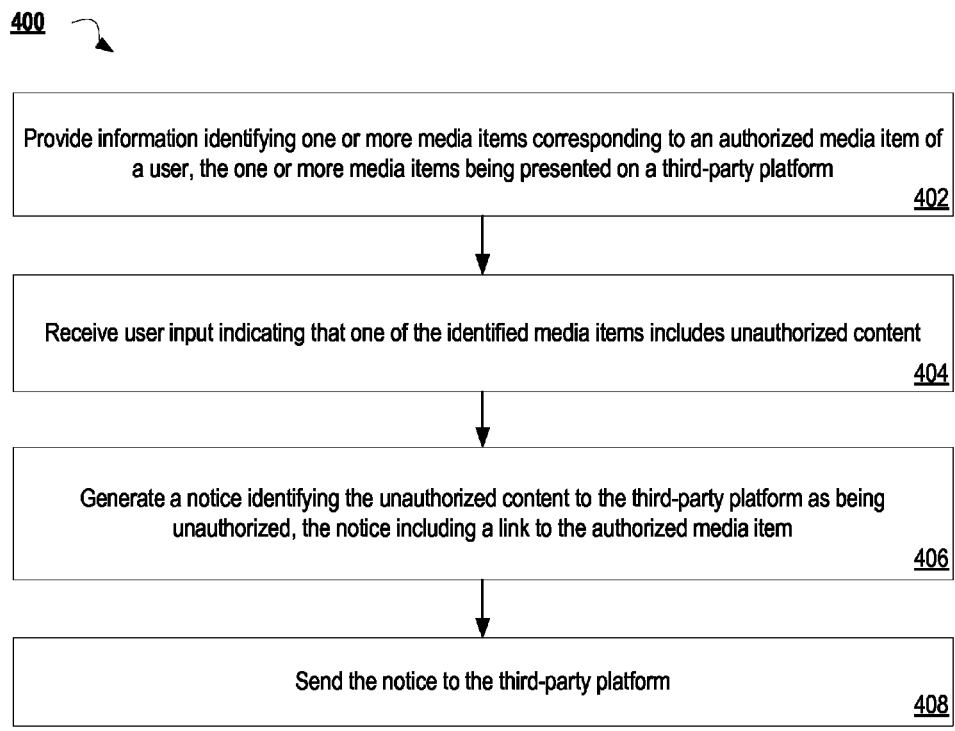
FIG. 4A is a flow diagram illustrating a method of replacing an unauthorized media item with an authorized media item, according to some embodiments of the disclosure.

FIG. 4A is a flow diagram illustrating a method 400 for facilitating the replacement of an unauthorized media item presented on a third-party platform with an authorized media item on another platform. The method 400 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any non-transitory, tangible computer-readable device or storage media. In one embodiment, method 400 may be performed by the content-sharing platform 140 and/or the media item management portal 146 as shown in FIGS. 1 and 2.

Embodiments of the method 400 may begin at block 402 when information is provided to a user identifying one or more media items corresponding to an authorized media item of the user. The one or more media items may be presented on a third-party platform. The user may be a legal rights holder of the authorized media item. The corresponding one or more media items may have been uploaded and/or shared on the third-party platform by users of the third-party platform. For example, the crawler 149B may crawl the third-party platform 160 and identify a plurality of media items 164A-Z. A media content identification system 149A may fingerprint some or all of the media items 164A-Z and determine that a fingerprint of the media item 164A matches that of the media item 144A, an authorized media item uploaded to the content-sharing platform 140 by the first user. The first user may hold the legal rights to the content in the media items 144A and at least some of the content in the media item 164A. Information identifying the media item 164A and the third-party platform 160 may be provided to the first user in a user interface 200 provided by the media item management portal 146. The information may facilitate the management of a plurality of media items for which the first user is the rights holder.

At block 404, input is received from the user that indicates that one or more of the identified media items includes unauthorized content. For example, the first user may confirm that at least some of the content in the media item 164A is property of the first user and that the uploading or sharing of the media item 164A on the third-party platform 160 was not authorized by the first user. As part of the user input or separately, processing logic can receive a user request to send a notice pertaining to the unauthorized content, where the notice should include a link to the authorized media item. For example, the user may be prompted, in the same user interface, to select one option such as a check box to confirm presence of the unauthorized content and to also select another option such as another check box to request that the notice with the link be generated. In another example, the user may first submit the confirmation of the presence of unauthorized content, and then be prompted to specify whether the notice with the link should be submitted.

At block 406, the processing logic may generate a notice identifying the unauthorized content to the third-party platform as being unauthorized. The notice includes one or more links to the authorized media item. The links may permit the third-party platform 160 to replace references to the unauthorized media item 164A with references to the authorized media item 144A. The authorized media item 144A may be embedded in the third-party platform in place of the unauthorized media item 164A.

At block 408, the processing logic may send the notice to the third-party platform 160. For example, the notice may be sent as an email to a recipient at the third-party platform. The recipient may be an email address designated by the operators of the third-party platform to receive takedown notices.

In some embodiments, the first user may indicate, by the processing logic, to the content-sharing platform that the media item 164A is actually authorized by the first user. This indication may be saved in a database that includes data for the first user. In such an instance, a notice may not be sent to the third-party platform 160.

Figure 4B:
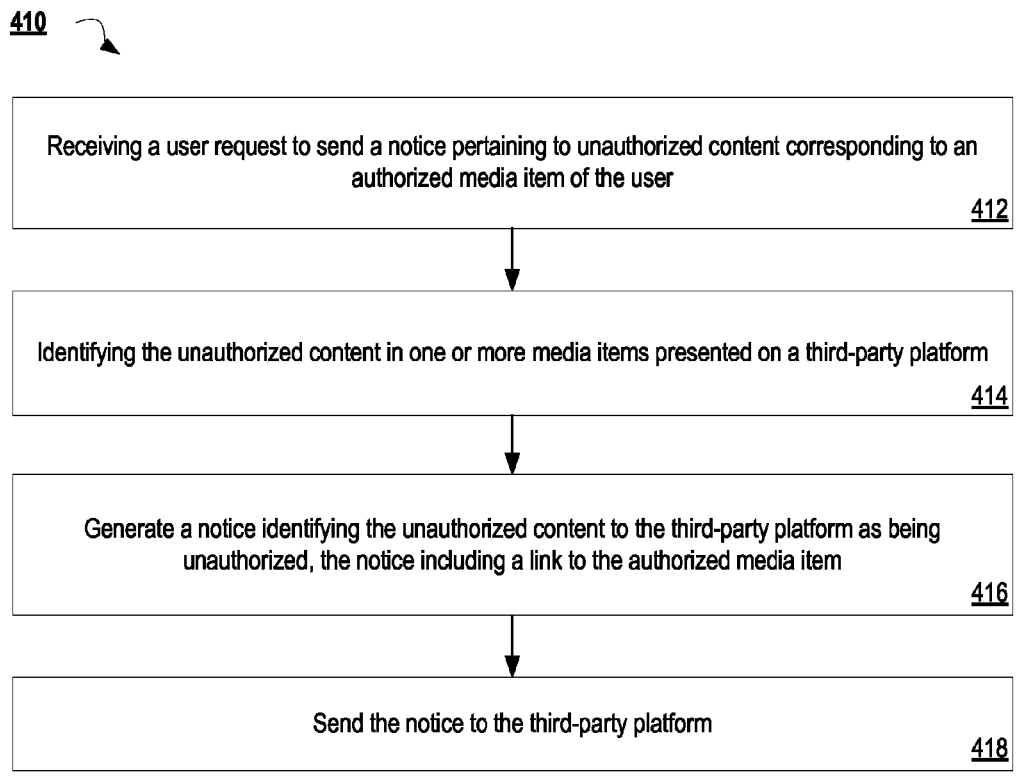
FIG. 4B is a flow diagram illustrating another method of replacing an unauthorized media item with an authorized media item, according to some embodiments of the disclosure.

FIG. 4B is a flow diagram illustrating a method 410 for facilitating the replacement of an unauthorized media item presented on a third-party platform with an authorized media item on another platform, according to some embodiments of the disclosure. The method 410 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 410 may be performed by the content-sharing platform 140 as shown in FIG. 1.

The method 410 may begin at block 412 in which processing logic receives a user request to send a notice pertaining to unauthorized content corresponding to an authorized media item of the user. For example, after a user uploads an authorized media item into the content-sharing platform 140 through an interface provided by the media item management portal 146. Upon uploading the authorized media item, the user interface of the management portal 146 may query the user to determine a response in the event that unauthorized content corresponding to the authorized media item is identified by the third-party platform crawler 149B and the identification system 149A in one or more media items. The user may request that the content-sharing platform 140 send the notice in the event that one or more media items including unauthorized media content are identified. In the request the user may specify that the identification of all media items including the unauthorized media content found on a specific third-party platform (e.g., third-party platform 222A of FIG. 2) should cause the content-platform 140 to send a notice to the specific third-party platform. The request may further specify that no notice is to be sent to another third-party platform (e.g., third party platform 222N of FIG. 2) under the same circumstances. The request can also specify that a notice to be sent to a third party platform should include a link to the authorized media item of the user.

In some embodiments, the request may be specific to a single authorized media item uploaded by the user to the content-sharing platform 140, to multiple selected authorized media items of the user, or to all authorized media items of the user. In this way the media item management portal 146 may facilitate the formulation of notice policies by the user. The notice policies may direct an automatic response by the content-sharing platform 140 in response to the identification of unauthorized content on a third-party platform 160. In formulating the notice policies, the user may indicate or confirm that the yet-to-be identified media items that include the unauthorized content are, in fact, not authorized by the user, the rights holder of the content.

At block 414, the processing logic may identify the unauthorized content in one or more media items presented on a third-party platform. For example, the third-party platform crawler 149B and the media content identification system 149A may crawl the third-party platform 160 and identify the media item 164A as including unauthorized content corresponding to the authorized media item.

At block 416, a notice may be generated by the processing logic. The notice may identify the unauthorized content to the third-party platform as being unauthorized. The notice may include a link to the authorized media item. For example, when the crawler 149B and the identification system 149A identify a media item including the unauthorized content, the media item management portal 146 may automatically generate a notice, like the notice 300 of FIG. 3. As seen in FIG. 3, the notice 300 identifies in the explanatory text 302 the specific media item on the third-party platform 222A that includes the unauthorized content. The notice 300 includes link 304 to the authorized media item that corresponding to the unauthorized content on the content-sharing platform 160.

After the notice is generated at block 416, it may be sent at block 418. The notice may be sent to the third-party platform which may have a designated means for receiving notices. For example, the third party platform 160 for FIG. 1 may have a designated email address for the reception for takedown notices. The content-sharing platform 140 may send the notice as an email to this address on behalf of the user. The notice may facilitate the third-party platform 160 in replacing unauthorized content with the corresponding authorized media item hosted by the content-sharing platform 140.

Figure 5:
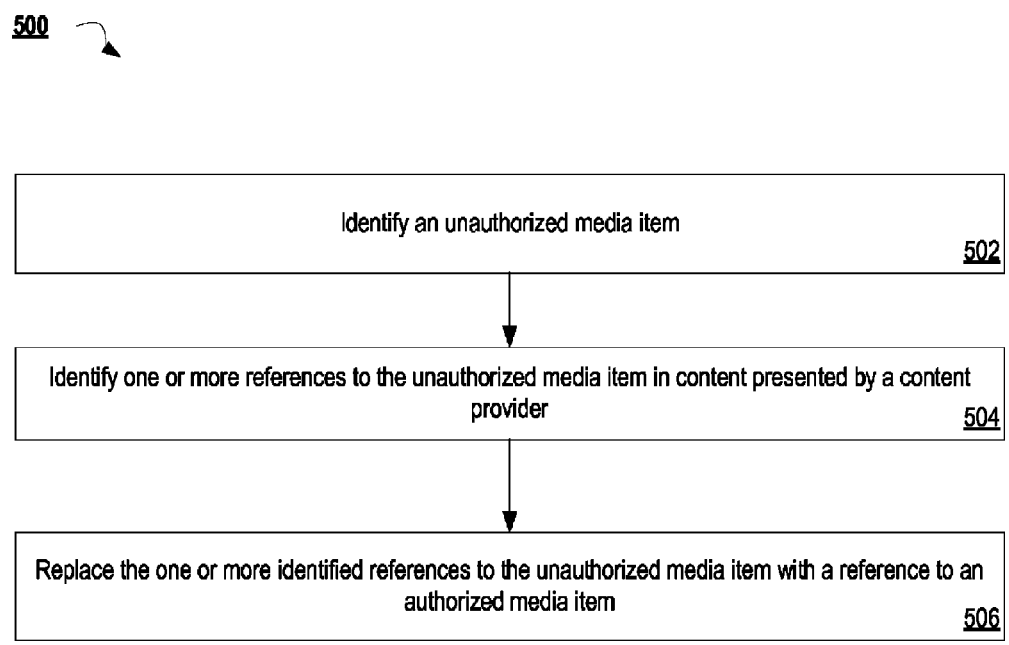
FIG. 5 is a flow diagram illustrating another method of replacing an unauthorized media item with an authorized media item, according to some embodiments of the disclosure.

FIG. 5 is a flow diagram illustrating a method 500 for replacing one or more references to an unauthorized media item with a reference to an authorized media item, according to an embodiment of the disclosure. The method 500 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 500 may be performed by the third-party platform 160 as shown in FIG. 1.

Referring to FIG. 5, method 500 may begin at block 402 when an unauthorized media item is identified. This may occur when a notice is received at content provider (e.g., the third-party platform 160 of FIG. 1) from a content-sharing platform. The notice may identify the media item and state that its presentation by the content provider is not authorized by a rights holder of the media item. The notice may further include one or more links to a corresponding, authorized media item. This authorized media item may be presented on a platform other than that of the content provider, such as the content-sharing platform 140 of FIG. 1.

At block 504, processing logic may search through one or more storages and/or databases of the content provider to identify one or more references therein to the unauthorized media item. The references may be included in social shares, in which the unauthorized media item was shared from one user to another or to a group of users.

As described, the notice may include one or more links to the corresponding, authorized media item. In embodiments in which the notice includes a plurality of links, a link that best conforms to a set of media requirements of the content provider may be selected for use in replacing the reference to the unauthorized media item. Rather than simply removing the references to the unauthorized media item and/or any social shares that included the references, the content provider may, at block 506, replace the one or more references to the unauthorized media item with a reference, such as a link from the notice, to the authorized media item presented on the content-sharing platform 140. By replacing the references to unauthorized media items with references with authorized media items, the content provider may preserve the good will of its users and avoid displaying takedown notice alerts through its social feeds or in other forms on its site.

Once the references have been replaced, any subsequent social shares may also include the reference to the authorized media item rather than the unauthorized media item.

Figure 6:
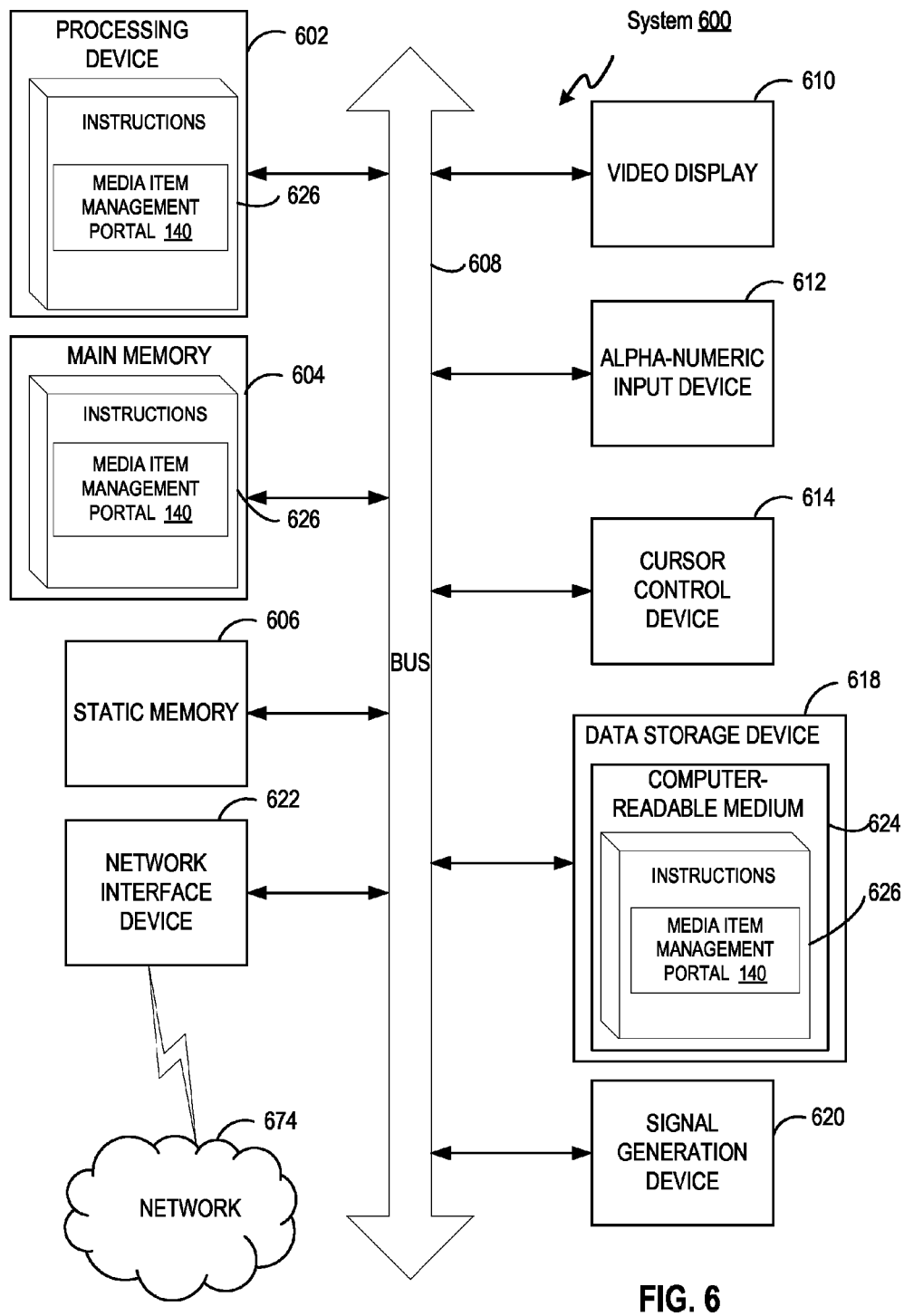
FIG. 6 is a block diagram illustrating an exemplary computer system, according to some embodiments.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD), a cathode ray tube (CRT), or a touch screen), an alphanumeric input device 612 (e.g., a keyboard), a cursor control device 614 (e.g., a mouse), and a signal generation device 620 (e.g., a speaker).

The data storage device 618 may include a non-transitory computer-readable storage medium 624 on which is stored one or more sets of instructions 626 (e.g., software) embodying any one or more of the methodologies or functions described herein. The instructions 626 may also reside, completely or at least partially, within the main memory 604 and/or within the processor 602 during execution thereof by the computer system 600, the main memory 604 and the processor 602 also constituting computer-readable storage media. The instructions 626 may further be transmitted or received over a network 674 via the network interface device 622.

In one embodiment, the instructions 626 include instructions for a media item management portal 140, which may correspond, respectively, to its identically-named counterpart described with respect to FIGS. 1 and 2, and/or a software library containing methods for splitting channels of content-sharing platform. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing", "analyzing", "determining", "receiving", "identifying", "generating", "replacing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Reference throughout this specification to "one embodiment" or "an embodiment" means that a particular feature, structure, or characteristic described in connection with the embodiment is included in at least one embodiment. Thus, the appearances of the phrase "in some embodiments" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
receiving, by a processing device of a content sharing platform, a user request to send, to a third-party platform that is separate from the content sharing platform, a notice pertaining to an unauthorized media item, the unauthorized media item being an unauthorized copy of an authorized media item of a first user, the first user being a rights holder of the unauthorized media item and the authorized media item;
presenting, to the first user, a user interface identifying a set of versions of the authorized media item;
receiving a user selection of one or more of the set of versions of the authorized media item via the user interface;
generating, by the processing device of the content sharing platform, a notice identifying the unauthorized media item to the third-party platform as having unauthorized content, the unauthorized media item being identified in a feed presented to a second user by the third-party platform and the notice identifying the one or more of the set of versions of the authorized media item that is to be presented in the feed by the third-party platform in place of the unauthorized media item; and
providing, by the processing device of the content sharing platform, the notice comprising the one or more of the set of versions of the authorized media item to the third-party platform identifying the authorized media item in the feed presented to the second user.

2. The method of claim 1, wherein the identifier is a link to the authorized media item that permits the authorized media item to be presented in the feed by the third-party platform in place of the unauthorized media item.

3. The method of claim 2, wherein the link replaces a reference in social shares on the third-party platform, the reference linking the social shares to the unauthorized media item, one of the social shares being included in the feed presented to the second user.

4. The method of claim 1, further comprising identifying the unauthorized media item corresponding to the authorized media item by crawling the third-party platform.

5. The method of claim 4, wherein the authorized media item is hosted by the content sharing platform and the third-party platform does not comprise at least one of a content monetization mechanism or a content identification system.

6. The method of claim 4, further comprising receiving user input indicating that the unauthorized media item includes the unauthorized content.

7. The method of claim 1, further comprising providing information identifying the unauthorized media item presented by the third-party platform.

8. The method of claim 1, further comprising sending the notice to the third-party platform.

9. The method of claim 1, further comprising:
receiving a request for the authorized media item from a third-party platform user; and
causing the rights holder to be remunerated for a presentation of the authorized media item on the third-party platform to the third-party platform user.

10. The method of claim 1, wherein receiving the user request to send the notice further comprises determining a notice policy of the first user, the notice policy directing a predetermined response to information identifying the unauthorized content, and wherein generating the notice is performed according to the notice policy of the first user.

11. The method of claim 1, further comprising:
determining one or more media requirements of the third-party platform; and
determining an appropriate version of the authorized media item based on the one or more media requirements, wherein the identifier is a link to the appropriate version of the authorized media item.

12. The method of claim 1, further comprises sending the notice to the third-party platform and another third-party platform, wherein the third-party platform presents the unauthorized content and the other third-party platform hosts the unauthorized content for the third-party platform.

13. A system comprising:
a memory for storing instructions; and
a processing device, coupled to the memory, the processing device to execute the instructions to:
receive, at a content sharing platform, a user request to send, to a third-party platform that is separate from the content sharing platform, a notice pertaining to an unauthorized media item, the unauthorized media item being an unauthorized copy of an authorized media item of a first user, the first user being a rights holder of the unauthorized media item and the authorized media item;
present, to the first user, a user interface identifying a set of versions of the authorized media item;
receive a user selection of one or more of the set of versions of the authorized media item via the user interface;
generate, by the content sharing platform, a notice identifying the unauthorized media item to the third-party platform as having unauthorized content, the unauthorized media item being identified in a feed presented to a second user by the third-party platform and the notice identifying the one or more of the set of versions of the authorized media item that is to be presented in the feed by the third-party platform in place of the unauthorized media item; and
provide, by the content sharing platform, the notice comprising the one or more of the set of versions of the authorized media item to the third-party platform identifying the authorized media item in the feed presented to the second user.

14. The system of claim 13, wherein the identifier is a link to the authorized media item that permits the authorized media item to be presented in the feed by the third-party platform in place of the unauthorized media item.

15. The system of claim 14, wherein the link replaces a reference in social shares on the third-party platform, the reference linking the social shares to the unauthorized media item, one of the social shares being included in the feed presented to the second user.

16. The system of claim 13, wherein the processing device is to further identify the unauthorized media item using a media item content identification.

17. The system of claim 16, wherein the processing device is to further present identifying information to the first user comprising an identifier of the unauthorized media item and an identifier of the third-party platform.

18. The system of claim 13, wherein the processing device is to further send the notice to the third-party platform upon identification of the unauthorized media item on the third-party platform.

19. The system of claim 13, wherein the processing device is to send the notice to the third-party platform upon receiving a request from the first user to send the notice.

20. A non-transitory computer-readable storage medium storing instructions which, when executed, cause a processing device to perform operations comprising:
receiving, by the processing device of a content sharing platform, a user request to send, to a third-party platform that is separate from the content sharing platform, a notice pertaining to an unauthorized media item, the unauthorized media item being an unauthorized copy of an authorized media item of a first user, the first user being a rights holder of the unauthorized media item and the authorized media item;
presenting, to the first user, a user interface identifying a set of versions of the authorized media item;
receiving a user selection of one or more of the set of versions of the authorized media item via the user interface;
generating, by the processing device of the content sharing platform, a notice identifying the unauthorized media item to the third-party platform as having unauthorized content, the unauthorized media item being identified in a feed presented to a second user by the third-party platform and the notice identifying the one or more of the set of versions of the authorized media item that is to be presented in the feed by the third-party platform in place of the unauthorized media item; and
providing, by the processing device of the content sharing platform, the notice comprising the one or more of the set of versions of the authorized media item to the third-party platform identifying the authorized media item in the feed presented to the second user.

21. The non-transitory computer-readable storage medium of claim 20, wherein the operations further comprise:
receiving, through a user interface, a request from the first user to generate the notice;
receiving a request from the first user to include the identifier in the notice; and
sending the notice to the third-party platform.

22. The non-transitory computer-readable storage medium of claim 20, wherein the identifier is a link to the authorized media item that permits the authorized media item to be presented in the feed by the third-party platform in place of the unauthorized media item.

23. A method comprising:
receiving, by a first content provider from a second content provider, a notice identifying an unauthorized media item, the unauthorized media item being an unauthorized copy of an authorized media item being hosted by the second content provider, and a set of versions of the authorized media item, wherein a user of the second content provider is a rights holder of the unauthorized media item and the authorized media item and wherein the set of versions was selected from a user interface comprising a plurality of versions of the authorized media item by the user;
identifying, by a processing device of the first content provider, the unauthorized media item based on the notice from the second content provider, the second content provider being a platform separate from the first content provider;
identifying, by the processing device of the first content provider, one or more references to the unauthorized media item in content presented by the first content provider; and
replacing, by the processing device of the first content provider, the one or more identified references to the unauthorized media content with a reference to one or more of the set of versions of the authorized media item hosted by the second content provider, the one or more of the set of versions of the authorized media item to be presented in place of the one or more references to the unauthorized media content.

24. The method of claim 23, further comprising, upon receiving a request from a second user of the first content provider to share the unauthorized media content with other users of the first content provider, replacing a reference in the request with the reference to the one or more of the set of versions of the authorized media item.

25. The method of claim 24, wherein the notice includes the reference to the authorized media item.

26. The method of claim 23, wherein the notice indicates that the unauthorized media item in content presented by the first content provider is unauthorized.

27. The method of claim 23, wherein the notice comprises links corresponding to the set of versions of the authorized media item, and wherein replacing the one or more identified references to the unauthorized media content with the reference further comprises selecting a link from the links corresponding to the set of versions of the authorized media item to use as the reference, the selected link conforming to a set of media requirements of the first content provider.

* * * * *